(12) United States Patent
Xie et al.

(10) Patent No.: US 10,334,413 B2
(45) Date of Patent: Jun. 25, 2019

(54) MANAGING MOBILE DEVICES ON DIFFERENT OPERATOR NETWORKS

(71) Applicant: Cisco Technology, Inc., San Jose, CA (US)

(72) Inventors: Lihuan Xie, Sunnyvale, CA (US); Stephan Otto, Palo Alto, CA (US); Blair David Martin, Sunnyvale, CA (US); Suvitha Kesavan, San Jose, CA (US); Suparna Kumar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 111 days.

(21) Appl. No.: 15/390,486

(22) Filed: Dec. 24, 2016

(65) Prior Publication Data
US 2018/0184228 A1 Jun. 28, 2018

(51) Int. Cl.
| | | |
|---|---|---|
| H04W 4/00 | (2018.01) | |
| H04W 4/50 | (2018.01) | |
| H04W 8/02 | (2009.01) | |
| H04L 29/08 | (2006.01) | |
| H04W 4/20 | (2018.01) | |
| H04L 29/06 | (2006.01) | |

(52) U.S. Cl.
CPC .......... *H04W 4/50* (2018.02); *H04L 67/2838* (2013.01); *H04L 67/36* (2013.01); *H04L 69/08* (2013.01); *H04W 4/203* (2013.01); *H04W 8/02* (2013.01); *H04L 67/02* (2013.01)

(58) Field of Classification Search
CPC ....... H04W 12/08; H04W 4/24; H04W 16/10; H04W 16/14
USPC ........................... 455/414.1, 415, 419, 452.2
See application file for complete search history.

(56) References Cited

U.S. PATENT DOCUMENTS

2013/0066986 A1* 3/2013 DiCosola ............... G06Q 10/10
709/206

* cited by examiner

*Primary Examiner* — Sam Bhattacharya
(74) *Attorney, Agent, or Firm* — Behmke Innovation Group LLC; James Behmke; Stephen D. LeBarron (57) ABSTRACT

Disclosed are techniques for managing mobile devices, such as cellular telephones, tablets, and laptop computers, deployed on different operator networks, such as cellular networks, permissioned Wi-Fi networks, LANs, and WANs. The techniques include receiving, at an interface module, a request identifying a mobile device and one of a plurality of operator networks associated with the device. The request manages the mobile device by initiating a change in a configuration state of the device on the associated operator network. The techniques further include selecting one of a plurality of adapter modules each configured to communicate with a particular one of the plurality of operator networks based on the request. The techniques also include bridging, using the selected adapter module, communication between the interface module and the operator network associated with the mobile device, such as transmitting the request to the network and subsequently receiving a response from the network.

20 Claims, 5 Drawing Sheets

MANAGING MOBILE DEVICES ON DIFFERENT OPERATOR NETWORKS

TECHNICAL FIELD

The present disclosure generally relates to mobile communication systems, and, in particular, to managing mobile devices that are deployed on different operator networks.

BACKGROUND

An enterprise typically utilizes numerous computing devices. For example, in some enterprises, employees have and/or are assigned computing devices that the employees use to perform their duties within the enterprise. The computing devices typically include mobile communication devices, or simply "mobile devices," that are deployed on operator networks. The mobile devices may include various types of devices, such as cellular phones, smartphones, tablet computers, laptop computers, and other portable devices. Due to the variety of operator networks that are available, mobile devices affiliated with an enterprise are usually deployed on a range of different operator networks—including cellular networks, permissioned Wi-Fi networks, and/or various LANs and WANs. As a result, in order to manage each of the mobile devices, an enterprise system may interface with a corresponding operator network via a dedicated user interface, or a so-called "dashboard," which may be unique to the mobile device and the particular operator network.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

DESCRIPTION OF EXAMPLE EMBODIMENTS

Numerous details are described herein to provide a thorough understanding of the illustrative implementations shown in the accompanying drawings. However, the drawings merely show some example aspects of the present disclosure and are therefore not to be considered limiting. Those of ordinary skill in the art will appreciate from the present disclosure that other effective aspects and/or variants do not include all of the specific details of the example implementations described herein. While pertinent features are shown and described, those of ordinary skill in the art will appreciate from the present disclosure that various other features, including well-known systems, methods, components, devices, and circuits, have not been shown or described in exhaustive detail for the sake of brevity and so as not to obscure more pertinent aspects of the described example implementations.

Overview

In various implementations disclosed herein, a device management system includes a non-transitory memory and one or more processors that enable the system to perform a method of managing mobile devices associated with different operator networks. The method includes receiving, at an interface module, a request including an indicator identifying a mobile device and one of a plurality of operator networks associated with the device. The request initiates a change in a configuration state of the mobile device on the one of the plurality of operator networks. The method further includes selecting, using an aggregator module, one of a plurality of adapter modules based on the request associated with the mobile device. Each of the plurality of adapter modules is configured to communicate with a particular one of the plurality of operator networks. The method also includes bridging, using the selected one of the plurality of adapter modules, communication between the interface module and the one of the plurality of operator networks associated with the mobile device.

Example Embodiments

The present disclosure generally relates to the field of mobile communications, and, more particularly, to managing mobile communications devices (hereinafter, "mobile devices") that are associated with communications networks provided by various operators (hereinafter, "operator networks"). According to various implementations, a device management system is configured to manage mobile devices that are associated with a single enterprise, such as a corporation, but are deployed on multiple different operator networks. In some implementations, the device management system includes a non-transitory memory and one or more processors that enable the system to perform a method. In some implementations, the method includes receiving, at an interface module of the device management system, a device management request (hereinafter, "request") that includes an indicator. In some implementations, the device management system receives the request from an enterprise user of the system via a graphical user interface (GUI), such as a so-called "dashboard," implemented as part of the interface module. In some implementations, the indicator includes various types of information that explicitly or implicitly identifies a particular one of the mobile devices that are associated with the enterprise and the one of the different operator networks on which the device is deployed. In some implementations, the request initiates a change in a configuration state of the mobile device on the operator network. For example, in some implementations, the request initiates a change to one or more parameters of the mobile device that pertain to the operator network. In other words, in some implementations, the request is configured to manage the mobile device on the operator network.

In some implementations, the method performed by the device management system further includes selecting one of multiple different adapter modules that are included in the system based on the request. In some implementations, each of the adapter modules is configured to communicate with a particular one of the operator networks associated with the mobile devices of the enterprise. In some implementations, the selected adapter module is configured to communicate with the operator network on which the mobile device indicated by the request is deployed. In some implementations, the device management system selects the adapter module based on any of a variety of textual, numeric, symbolic, and other types of matches identified by the system between the operator network identified by the request and the operator network associated with the selected adapter module.

In some implementations, the method performed by the device management system also includes bridging communication between the interface module and the operator network associated with the mobile device using the selected adapter module. In other words, in some implementations, upon selecting the adapter module, the device management system uses the adapter module as an interface between the interface module and the operator network on which the mobile device is deployed. In some implementations, bridging the communication in this manner includes transmitting the request, such as a request to change a configuration state of the mobile device on the operator network, from the interface module to the network using the selected adapter module. In some implementations, bridging the communication further includes receiving a device management response (hereinafter, "response"), such as a confirmation of the changed configuration state of the mobile device, from the operator network in response to transmitting the request, and transmitting the response to the interface module.

In some implementations, the device management system further receives one or more additional requests from the same or a different enterprise user via the interface or dashboard implemented as part of the interface module. In some implementations, each subsequent request received by the device management system includes an indicator that identifies another one of the mobile devices associated with the enterprise and another one of the operator networks on which that particular device is deployed. In some implementations, the device management system processes these requests in a similar manner as previously described. In some implementations, for each such request, the device management system selects another one of the adapter modules and uses the selected module to bridge the communication between the interface module and the corresponding one of the operator networks identified by the request.

In this manner, the techniques of this disclosure may, in some examples, enable enterprises to efficiently manage mobile devices that are deployed on different operator networks. Additionally, the techniques may, in some instances, improve user experience. For example, the techniques may enable an enterprise user to manage each such mobile device by communicating with the operator network associated with the device using a unified interface (e.g., a GUI), or dashboard. The techniques may further enable the user to manage one or more additional ones of the mobile devices in an analogous manner using the same unified interface or dashboard. As a result, the user may manage multiple ones of the mobile devices using less time compared to other techniques, such as when using a dedicated interface or dashboard associated with each device, thereby improving the user's efficiency. Furthermore, by enabling the user to manage the mobile devices using the unified interface rather than the dedicated interfaces associated with each device, the techniques may also improve the user's experience.

A mobile device, as used herein, may include any portable computing device capable of communicating with an operator network and, in particular, with an operator or entity associated with the network, over a corresponding network infrastructure (e.g., a network of cellular towers and associated devices). The mobile device may include any of a smartphone, a tablet, and a laptop computing device, as well as any other portable computing device having another form factor, such as a smart watch, smart glasses, or another device type. Additionally, the mobile device of the present disclosure may use a variety of different operating systems or platforms, such as ANDROID® by Google Inc., IOS® by Apple Inc., or WINDOWS PHONE® by Microsoft Corporation, as some examples.

An operator network, as used herein, may include any type of network, such as a mobile network. In some implementations, the operator network includes a cellular network provided by any of a variety of network operators or entities, such as AT&T, Verizon, Sprint, Voda, Orange, as some examples. In some implementations, the operator network includes a Long-Term Evolution (LTE) network, including LTE network elements such as any of eNodeB, Home Subscriber Server (HSS), Packet Data Network Gateway (P-GW), serving gateway (S-GW), Mobility Management Entity (MME), and so forth. In some implementations, the operator network includes any of a permissioned Wi-Fi network and any of a variety of local area networks (LANs) and wide area networks (WANs), each of which is provided by any number of network operators or entities. Accordingly, the operator network of the present disclosure may be implemented using a variety of network technologies. Furthermore, the operator network may be associated with a particular network operator or entity. As described herein, the operator network may have deployed thereon one or more mobile devices that are each configured to communicate with the associated network operator or entity over a corresponding network medium. As also described herein, the operator network may provide an interface or dashboard configured to enable users to manage the mobile devices deployed on the network, such as change a configuration state of each such device on the network.

Figure 1:
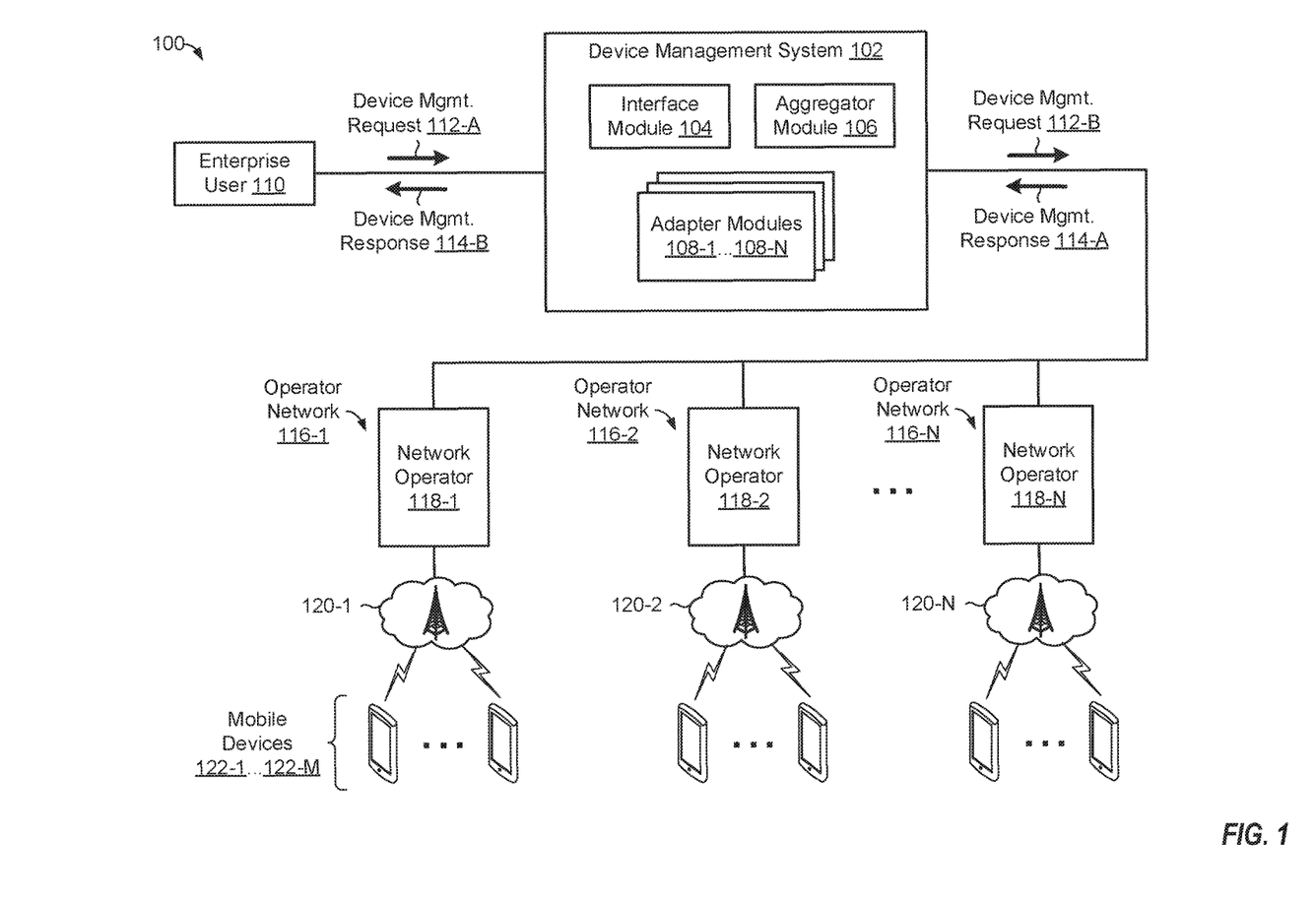
FIG. 1 is a schematic diagram of a device management environment that includes a device management system in communication with one or more operator networks in accordance with some implementations.

FIG. 1 depicts a device management environment 100 including a device management system 102 that is in communication with an enterprise user 110 and one or more operator networks 116-1 . . . 116-N. While certain specific features are illustrated, those of ordinary skill in the art will appreciate from the present disclosure that various other features have not been illustrated for the sake of brevity and so as not to obscure more pertinent aspects of the example implementations disclosed herein. In the example environment 100, the enterprise user 110 is an administrator user associated with an enterprise. The device management system 102, in turn, is a system of one or more computing devices used by the enterprise user 110 to manage one or more mobile devices 122-1 . . . 122-M that are also associated with the enterprise. In this example, each of the mobile device(s) 122-1 . . . 122-M is deployed on a particular one of the operator network(s) 116-1 . . . 116-N.

In the example of FIG. 1, each of the operator network(s) 116-1 . . . 116-N includes a network operator (e.g., one of network operators 118-1 . . . 118-N) and a network infrastructure, such as a network of cellular towers and associated devices (e.g., one of network infrastructures 120-1 . . . 120-N). In some implementations, the network operator serves as a gateway for the network infrastructure. In some implementations, the network operator channels traffic between the network infrastructure and a computing device that is located outside of the corresponding operator network. To that end, in some implementations, the network operator includes a gateway node. In some implementations, each network infrastructure includes various network elements, such as a set of interconnected physical network nodes (e.g., servers, routers, modems, etc.) that enable communication between the corresponding one(s) of the mobile device(s) 122-1 . . . 122-M. In some implementations, the network elements are configured to control the flow of data packets between the mobile device(s). In some implementations, the network elements include various components of cellular networks.

In the example of FIG. 1, each network operator provides one or more network interfaces that enable users to manage the corresponding one(s) of the mobile device(s) 122-1 . . . 122-M that are deployed or are operating on the associated operator network. In some implementations, the network interfaces enable the users to view a list of mobile devices that are deployed on the operator network, change a subscription plan, such as a rate plan, for one or more of the devices, add and/or remove features (e.g., roaming, hotspot, etc.) for one or more of the devices, add a new mobile device to the network, and so forth. In this manner, the network interfaces enable the users to change configuration states of the mobile device(s) 122-1 . . . 122-M with respect to, or on, the operator network(s) 116-1 . . . 116-N. In some implementations, the users communicate with the network interfaces provided by each network operator using a dedicated interface or dashboard. As a result, in some implementations, users wishing to communicate with multiple ones of the network operators interact with multiple different interfaces or dashboards. Advantageously, the device management system 102 of the present disclosure enables the users to interact with multiple ones of the network operators using a single unified interface or dashboard, as described herein.

As shown in FIG. 1, the enterprise user 110 manages the mobile device(s) 122-1 . . . 122-M by communicating directly with the device management system 102. In some implementations, the enterprise user 110 communicates with the device management system 102 using a client device (not shown). In the example of FIG. 1, the enterprise user 110 provides a request 112-A to an interface module 104 of the device management system 102. In this example, the request 112-A includes an indicator (e.g., packetized binary data) that identifies one of the mobile device(s) 122-1 . . . 122-M and one of the operator network(s) 116-1 . . . 116-N associated with the mobile device. Also in this example, the request 112-A initiates a change in a configuration state of the mobile device on the operator network. In other words, the request 112-A is configured to cause the operator network to, upon receiving the request 112-A, change a configuration state of the mobile device with respect to the network. In some implementations, the enterprise user 110 provides the request 112-A by inputting one or more parameters associated with the mobile device and, e.g., the operator network, into a GUI provided by the interface module 104.

As further shown in FIG. 1, an aggregator module 106 of the device management system 102 selects one of multiple adapter modules 108-1 . . . 108-N included in the system 102 based on the request 112-A. In the example of FIG. 1, each of the adapter modules 108-1 . . . 108-N is configured to communicate with a particular one of the operator network(s) 116-1 . . . 116-N. In some implementations, the aggregator module 106 selects the adapter module that is configured to communicate with the operator network associated with the mobile device identified by the request 112-A. In some implementations, the aggregator module 106 determines a correspondence between the request 112-A and the selected adapter module, such as an identity relationship between an operator network identified by the request 112-A and an operator network associated with the selected module). In some implementations, the aggregator module 106 makes a call (e.g., an API call, a subroutine call, etc.) to the selected adapter module.

As also shown in FIG. 1, the selected adapter module bridges communication between the interface module 104 and the operator network associated with the mobile device. As described in greater detail below, in some implementations, to bridge the communication between the interface module 104 and the operator network, the selected adapter module transmits the request 112-A (e.g., as a translated version of the request 112-B) to the network. In some implementations, the selected adapter module further receives a response 114-A from the operator network in response to transmitting the request 112-A (and, e.g., generates a translated version of the response 114-B). In various implementations, the selected adapter module communicates with the operator network via any type of network, such as a LAN, a WAN, and/or the Internet (e.g., a public network, such as portions of the Internet, and/or a private network). In some implementations, the response 114-A indicates a status of the request 112-A (e.g., request received, request being processed, request granted, or request denied). In some implementations, the response 114-A indicates whether an action requested by the request 112-A has been completed (e.g., a new device was added, a requested rate plan was activated on a mobile device, or an operator network access has been disabled for a mobile device). In some implementations, the response 114-A includes information requested by the request 112-A (e.g., a list of mobile devices that are associated with the enterprise and are currently operating on a particular operator network or have a particular feature, such as a roaming package).

In some implementations, the device management system 102 further displays, using the interface module 104 (e.g., a GUI module), a GUI to the enterprise user 110. In some implementations, the device management system 102 receives the request 112-A at the interface module 104 from the enterprise user 110 via the GUI displayed to the user 110. In some implementations, the enterprise user 110 specifies the request 112-A by inputting one or more textual, numeric, and/or symbolic parameters associated with the mobile device and, e.g., the operator network, identified by the request 112-A into the GUI. In some implementations, the interface module 104 (e.g., the GUI module) also displays the response 114-A (e.g., the translated version of the response 114-B) received from the operator network in response to transmitting the request 112-A to the network.

In some implementations, to bridge the communication between the interface module 104 and the operator network associated with the mobile device, the device management system 102 transmits, using the selected adapter module, at least a portion of the request 112-A to the network (e.g., after translating the request 112-A). In some implementations, to transmit at least the portion of the request 112-A to the operator network, the device management system 102 transmits one of the following: (1) a single query; (2) first and second queries that are different; and (3) a pipeline of queries, including a plurality of different queries.

In some implementations, to bridge the communication between the interface module 104 and the operator network associated with the mobile device, the device management system 102 further receives, using the selected adapter module, the response 114-A from the network in response to transmitting at least the portion of the request 112-A. In some implementations, the device management system 102 then transmits, using the selected adapter module, at least a portion of the response 114-A to the interface module 104 (e.g., after translating the response 114-A). In some implementations, to receive the response 114-A from the operator network, the device management system 102 initially receives a ticket number. In some implementations, the device management system 102 receives the ticket number from the operator network via the selected adapter module. The device management system 102 then polls, using the selected adapter module, the operator network based on the ticket number. The device management system 102 further, in response to polling, receives, using the selected adapter module, the response 114-A from the operator network. In some implementations, to receive the response 114-A from the operator network, the device management system 102 receives, using the selected adapter module, a push message encapsulating the response 114-A from the network.

In some implementations, the selected adapter module is associated with a first application programming interface (API) configured to receive requests conforming to an adapter API format (e.g., from the interface module 104). In some implementations, the operator network associated with the mobile device is associated with a second, different API configured to receive requests conforming to a different network API format (e.g., from the corresponding adapter module or another device). In other words, in some implementations, the selected adapter module and the associated operator network communicate differently, e.g., using different communication formats and/or different communication protocols. In some implementations, the request 112-A conforms to both the adapter API format and the network API format. In some implementations, the request 112-A conforms to the adapter API format, but does not conform to the network API format. As a result, in some implementations, the operator network is unable to interpret the request 112-A received from the interface module 104. In some implementations, to bridge the communication between the interface module 104 and the operator network, the device management system 102 translates, using the selected adapter module, at least a portion of the request 112-A from the adapter API format to the network API format such that the network is able to interpret the request 112-A.

In some implementations, the second API is further configured to transmit responses conforming to the network API format (e.g., to the corresponding adapter module or another device) and the first API is further configured to transmit responses conforming to the adapter API format (e.g., to the interface module 104). As a result, in some implementations, the interface module 104 is unable to interpret the response 114-A received from the operator network. In some implementations, to bridge the communication between the interface module 104 and the operator network, the device management system 102 translates, using the selected adapter module, at least a portion of the response 114-A from the network API format to the adapter API format such that the interface module 104 is able to interpret the response 114-A.

In some implementations, the selected adapter module includes a representational state transfer (REST)-based adapter module. In some implementations, the adapter API format includes a first REST API format and the network API format includes a second, different REST API format. Alternatively, in some implementations, the selected adapter module includes a simple object access protocol (SOAP)-based adapter module. In some implementations, the adapter API format includes a first SOAP API format and the network API format includes a second, different SOAP API format. Alternatively, in some implementations, the selected adapter module includes a file-based adapter module. In some implementations, the adapter API format includes a file-based API format and the network API format includes a second, different API format other than the file-based API format. In various implementations, the selected adapter module includes one of a REST-based adapter module, a SOAP-based adapter module, and a file-based adapter module. Accordingly, in some implementations, one of the adapter API format and the network API format includes one of the REST API format, the SOAP API format, and the file-based API format and another one of the adapter API format and the network API format includes another (e.g., a different) one of the REST API format, SOAP API format, and file-based API format.

In some implementations, the indicator, or another indicator, included in the request 112-A further identifies a second one of the operator network(s) 116-1 . . . 116-N that is also associated with the same mobile device. In some implementations, the request 112-A further initiates a change in a second configuration state of the mobile device on the second operator network. In other words, in some implementations, the request 112-A is configured to manage the mobile device on the second operator network. In some implementations, the device management system 102 further selects, using the aggregator module 106, another one of the adapter modules 108-1 . . . 108-N that is configured to communicate with the second operator network based on the request 112-A. The device management system 102 then bridges, using the selected other adapter module, communication between the interface module 104 and the second operator network.

In some implementations, to bridge the communication between the interface module 104 and the first and second operator networks, as described herein, the device management system 102 transmits, using each of the selected adapter modules, at least a portion of the request 112-A to the corresponding one of the first and second operator networks (e.g., after translating the request 112-A). In some implementations, to bridge the communication in this manner, the device management system 102 further receives, using each of the selected adapter modules, a response 114-A from the corresponding one of the first and second operator networks in response to transmitting at least the portion of the request 112-A. The device management system 102 then aggregates, using the aggregator module 106, the received responses 114-A (e.g., after translating each response 114-A) and transmits, e.g., using the aggregator module 106, the aggregated responses 114-A to the interface module 104.

Figure 2:
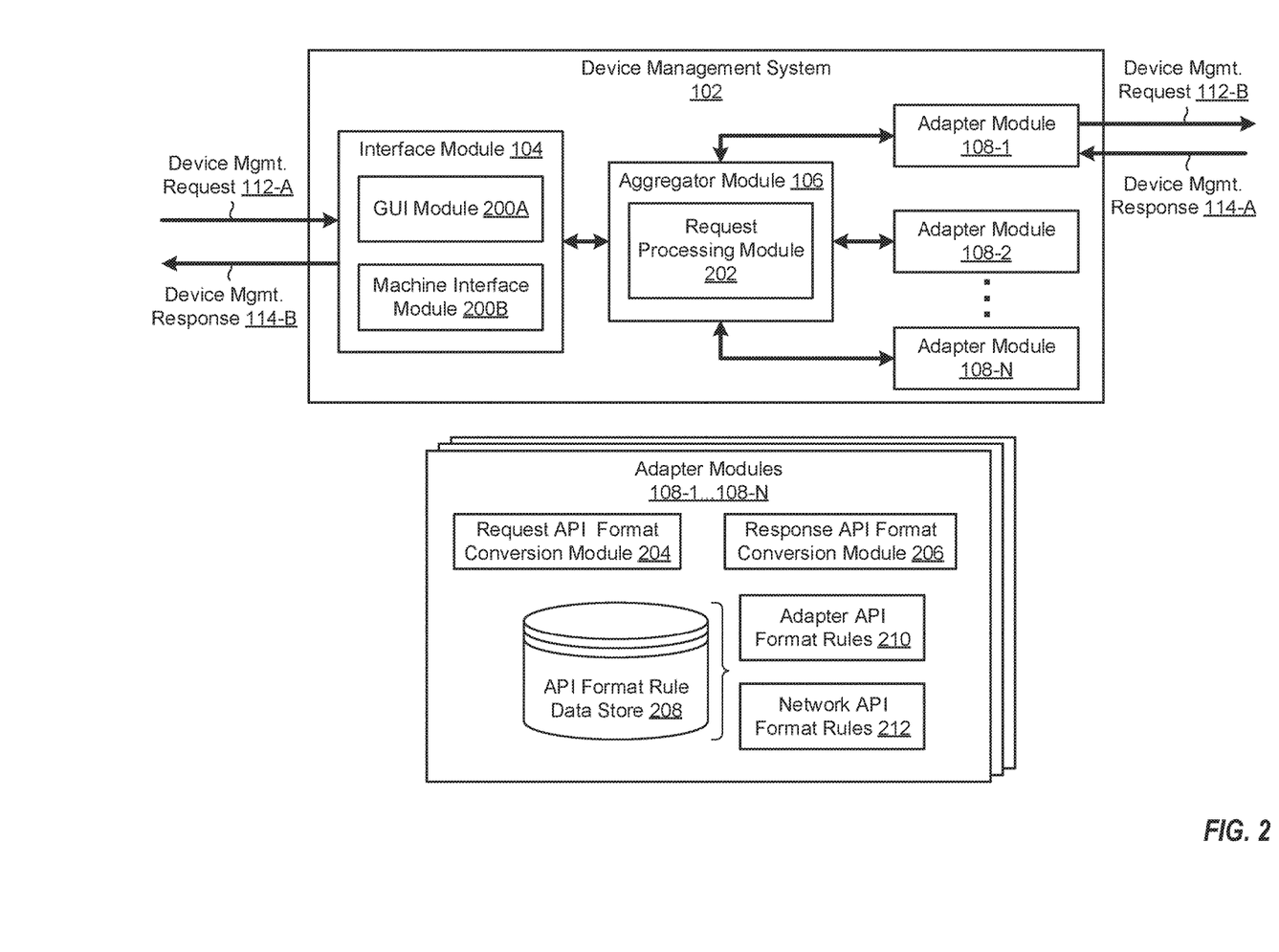
FIG. 2 is a block diagram of the device management system in accordance with some implementations.

FIG. 2 is a block diagram of an example implementation of the device management system 102 described with reference to FIG. 1. The device management system 102 of FIG. 2 includes the interface module 104, the aggregator module 106, and the adapter modules 108-1 . . . 108-N. Briefly, the interface module 104 enables communication between the device management system 102 and the enterprise user 110. In some implementations, the interface module 104 enables communication between the device management system 102 and a client device (not shown) associated with the enterprise user 110 or another user. The aggregator module 106 and the adapter modules 108-1 . . . 108-N, in turn, enable communication between the device management system 102 and the operator network(s) 116-1 . . . 116-N. As a result, the device management system 102 bridges communication between the interface module 104 and, therefore, the enterprise user 110 and/or the client device, and one or more of the operator network(s) 116-1 . . . 116-N. This bridging of the communication, in turn, allows the enterprise user 110 and/or the client device to manage one or more of the mobile device(s) 122-1 . . . 122-M on one or more of the operator network(s) 116-1 . . . 116-N.

In the example of FIG. 2, the interface module 104 initially receives the request 112-A from the enterprise user 110. In some implementations, the interface module 104 displays a GUI to the enterprise user 110 using a GUI module 200A included in the interface module 104. In some implementations, the interface module 104 receives the request 112-A from the enterprise user 110 via the GUI. In some implementations, the enterprise user 110 specifies the request 112-A by inputting one or more parameters associated with the associated mobile device and operator network into the GUI. In some implementations, the interface module 104 receives the request 112-A from the enterprise user 110 via a client device associated with the user 110 using a machine interface module 200B included in the interface module 104. In some implementations, the enterprise user 110 specifies the request 112-A using a GUI displayed at the client device in a similar manner as previously described.

In the example of FIG. 2, the aggregator module 106 further selects one of the adapter modules 108-1 . . . 108-N based on the request 112-A received by the interface module 104. In some implementations, the aggregator module 106 selects the adapter module configured to communicate with the operator network identified by the request 112-A. In some implementations, to select the adapter module, the aggregator module 106 processes the request 112-A using a request processing module 202 included in the aggregator module 106. In some implementations, the request processing module 202 initially determines whether the request 112-A explicitly or implicitly indicates a particular one of the operator network(s) 116-1 . . . 116-N. In the event the request 112-A indicates one such operator network, the aggregator module 106 further determines whether the network is also associated with a particular one of the adapter modules 108-1 . . . 108-N. In the event the operator network is associated with one such adapter module, the aggregator module 106 selects the adapter module. In some implementations, the request processing module 202 directly determines a correspondence between the operator network indicated by the request 112-A and the operator network associated with the selected adapter module. In some implementations, the request processing module 202 makes a call to the selected adapter module based on the request 112-A. In some implementations, the call includes the request 112-A. In the example of FIG. 2, the aggregator module 106 selects the adapter module 108-1. In other examples, the aggregator module 106 may select another one of the adapter modules 108-1 . . . 108-N.

In the example of FIG. 2, the selected one of the adapter modules 108-1 . . . 108-N subsequently bridges communication between the interface module 104 and the one of the operator network(s) 116-1 . . . 116-N identified by the request 112-A. As described herein, in some implementations, to bridge the communication, the selected adapter module performs one or more of (1) transmitting the request 112-A to the network; and (2) receiving a response 114-A from the network in response to transmitting the request 112-A, and transmitting the response 114-A to the interface module 104.

As further described herein, in some implementations, the selected adapter module further translates the request 112-A from an adapter API format associated with the adapter module to a network API format associated with the corresponding operator network, thereby generating a translated version of the request 112-B. As also described herein, in some implementations, the selected adapter module also translates the response 114-A received from the operator network from the network API format to the adapter API format, thereby generating a translated version of the response 114-B. To that end, as shown in FIG. 2, in some implementations, each of one or more of the adapter modules 108-1 . . . 108-N includes a request API format conversion module 204, a response API format conversion module 206, and an API format rule data store 208. In some implementations, the API format rule data store includes adapter API format rules 210 and network API format rules 212.

In some implementations, the request API format conversion module 204 enables the corresponding adapter module to translate the request 112-A from the adapter API format to the network API format using the adapter API format rules 210 and the network API format rules 212. In some implementations, the adapter API format rules 210 and the network API format rules 212 each specify one or more specific data fields (e.g., a header field, etc.) for the request 112-A and the translated version of the request 112-B to conform to their respective adapter and network API formats. Similarly, in some implementations, the response API format conversion module 206 enables the adapter module to translate the response 114-A from the network API format to the adapter API format using the adapter API format rules 210 and the network API format rules 212. In some implementations, the adapter API format rules 210 and the network API format rules 212 each further specify one or more specific data fields (e.g., a header field, etc.) for the response 114-A and the translated version of the response 114-B to conform to their respective network and adapter API formats, in a similar manner as previously described.

In some implementations, the request API format conversion module 204 synthesizes a data container (e.g., a JavaScript Object Notation (JSON) object) that represents the translated version of the request 112-B. In some implementations, the request API format conversion module 204 writes information from the original request 112-A into the data container according to the network API format rules 212. In some implementations, the request API format conversion module 204 includes in the data container one or more specific data fields that the corresponding operator network expects in the translated version of the request 112-B in accordance with the network API format rules 212.

Similarly, in some implementations, the response API format conversion module 206 synthesizes a data container (e.g., a JSON object) that represents the translated version of the response 114-B. In some implementations, the response API format conversion module 206 writes information from the original response 114-A into the data container according to the adapter API format rules 210. In some implementations, the response API format conversion module 206 includes in the data container one or more specific data fields that the interface module 104 expects in the translated version of the response 114-B in accordance with the adapter API format rules 210.

Figure 3:
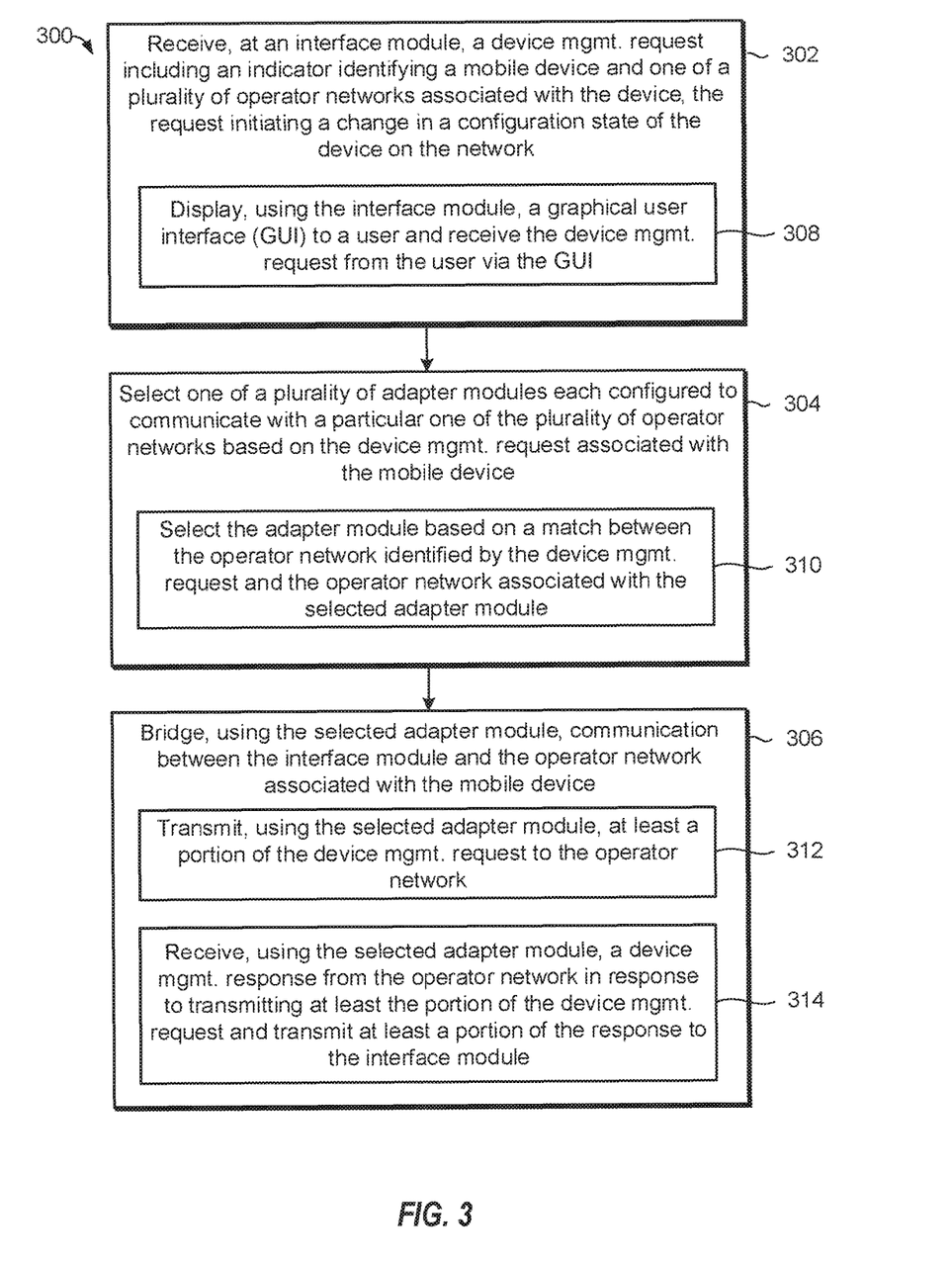
FIG. 3 is a flowchart representation of a method of managing mobile devices deployed on multiple different operator networks in accordance with some implementations.

FIG. 3 is a flowchart representation of a method 300 of managing mobile devices that are deployed on multiple different operator networks, in accordance with some implementations. The method 300 may be implemented as a set of one or more computer readable instructions that are stored in one or more memory components and executed by one or more central processing units (CPUs) included in the device management system 102. Briefly, the example method 300 includes receiving a request 112-A at the interface module 104, selecting one of the adapter modules 108-1 . . . 108-N using the aggregator module 106 based on the request 112-A, and bridging communication between the interface module 104 and the corresponding one of the operator network(s) 116-1 . . . 116-N using the selected adapter module.

As shown in block 302, the device management system 102 initially receives, at the interface module 104, a request 112-A that includes an indicator (e.g., packetized binary data). In this example, the indicator identifies one of the mobile device(s) 122-1 . . . 122-M and one of the operator network(s) 116-1 . . . 116-N that is associated with the mobile device. Also in this example, the request 112-A initiates a change in a configuration state of the mobile device on the operator network. In other words, the request 112-A is configured to manage the mobile device on the operator network. In some implementations, the request 112-A initiates a change to one or more parameters of the mobile device that pertain to the operator network. In some implementations, as shown in block 308, the device management system 102 displays, using the interface module 104, a GUI to a user and receives the request 112-A from the user via the GUI.

As shown in block 304, the device management system 102 further selects, e.g., using the aggregator module 106, one of the adapter modules 108-1 . . . 108-N based on the request 112-A associated with the mobile device. In this example, each of the adapter modules 108-1 . . . 108-N is configured to communicate with a particular one of the operator network(s) 116-1 . . . 116-N. In some implementations, the selected adapter module is configured to communicate with the operator network that is associated with the mobile device identified by the request 112-A. In this manner, the device management system 102 selects an adapter module that is configured to interface with the operator network on which the mobile device is deployed. In some implementations, as shown in block 310, the device management system 102 selects the adapter module based on any of textual, numeric, symbolic, and other matches between the operator network identified by the request 112-A and the operator network associated with the selected adapter module.

As shown in block 306, the device management system 102 then bridges, using the selected adapter module, communication between the interface module 104 and the operator network associated with the mobile device identified by the request 112-A. In this manner, the device management system 102 uses the selected adapter module to serve as a communication interface between the interface module 104 and the operator network associated with the mobile device. In some implementations, as shown in block 312, to bridge the communication between the interface module 104 and the operator network, the device management system 102 transmits at least a portion of the request 112-A to the network using the selected adapter module. In some implementations, as shown in block 314, the device management system 102 further receives, using the selected adapter module, a response 114-A from the operator network in response to transmitting at least the portion of the request 112-A. The device management system 102 then transmits the response 114-A to the interface module 104. As described in greater detail with reference to FIG. 4, in some implementations, the device management system 102 also translates an API format associated with one or more of the request 112-A and the response 114-A.

Figure 4:
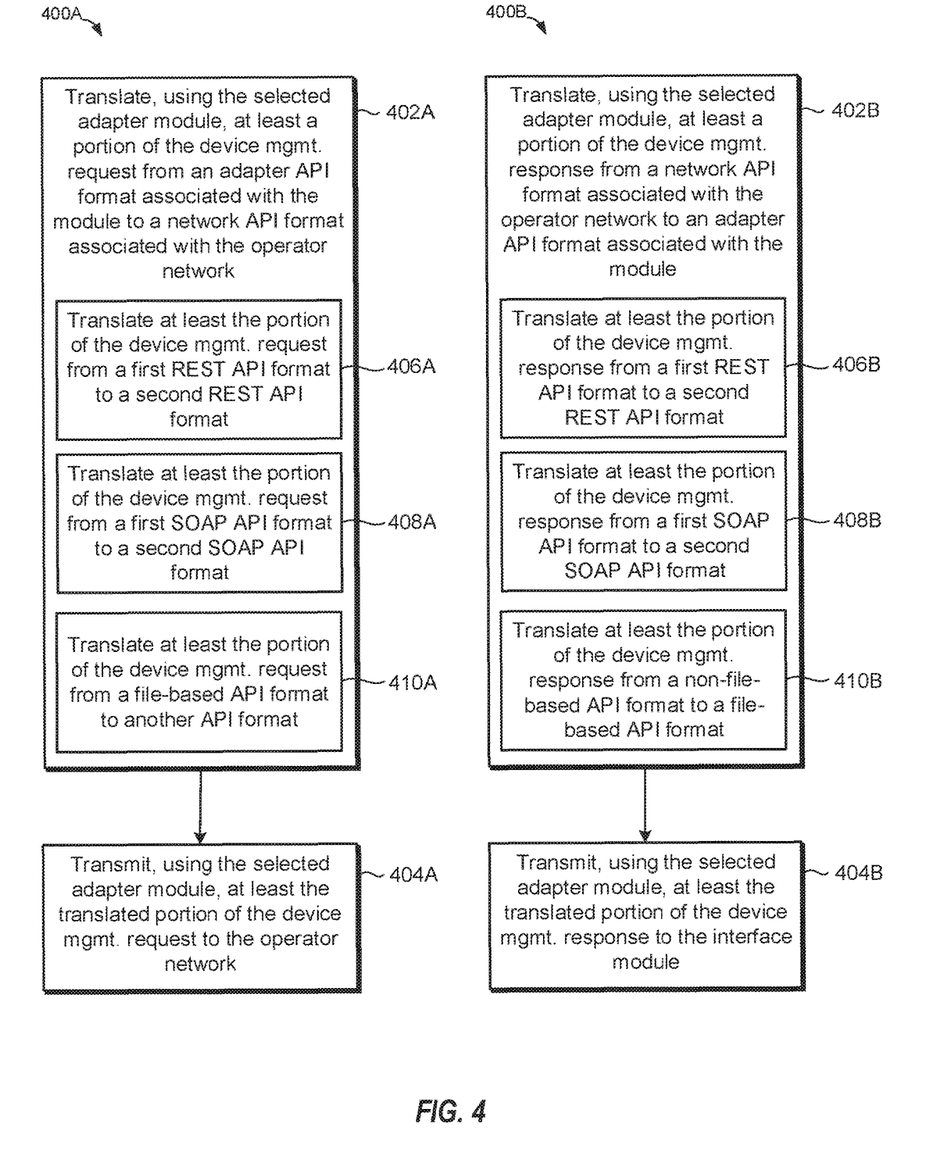
FIG. 4 is a flowchart representation of a method of managing mobile devices deployed on multiple different operator networks in accordance with some implementations.

FIG. 4 is a flowchart representation of methods 400A and 400B of managing mobile devices that are deployed on multiple different operator networks, in accordance with some implementations. In some implementations, the methods 400A and 400B illustrate particular aspects of the method 300 relating to bridging the communication between the interface module 104 and the operator network associated with the mobile device identified by the request 112-A. The methods 400A and 400B may each be implemented as a set of one or more computer readable instructions that are stored in one or more memory components and executed by one or more CPUs included in the device management system 102. Briefly, the example method 400A includes translating a request 112-A from an adapter API format to a network API format and transmitting a translated version of the request 112-B to one of the operator network(s) 116-1 . . . 116-N. The example method 400B includes translating a response 114-A received from the operator network from the network API format to the adapter API format and transmitting a translated version of the response 114-B to the interface module 104.

As shown in block 402A of the method 400A, the device management system 102 translates, using the selected adapter module, at least a portion of the request 112-A from an adapter API format associated with the adapter module to an network API format associated with the corresponding operator network. In some implementations, as shown in block 406A, the device management system 102 translates at least the portion of the request 112-A from a first REST API format to a second REST API format. In some implementations, as shown in block 408A, the device management system 102 translates at least the portion of the request 112-A from a first SOAP API format to a second SOAP API format. In some implementations, as shown in block 410A, the device management system 102 translates at least the portion of the request 112-A from a file-based API format to another, non-file-based API format. As shown in block 404A, the device management system 102 then transmits, using the selected adapter module, at least the translated portion of the request 112-B to the operator network.

As shown in block 402B of the method 400B, the device management system 102 also translates, using the selected adapter module, at least a portion of the response 114-A from the network API format to the adapter API format. In some implementations, as shown in block 406B, the device management system 102 translates at least the portion of the response 114-A from a first REST API format to a second REST API format. In some implementations, as shown in block 408B, the device management system 102 translates at least the portion of the response 114-A from a first SOAP API format to a second SOAP API format. In some implementations, as shown in block 410B, the device management system 102 translates at least the portion of the response 114-A from a non-file-based API format to a file-based API format. As shown in block 404B, the device management system 102 then transmits, using the selected adapter module, at least the translated portion of the response 114-B to the interface module 104.

Figure 5:
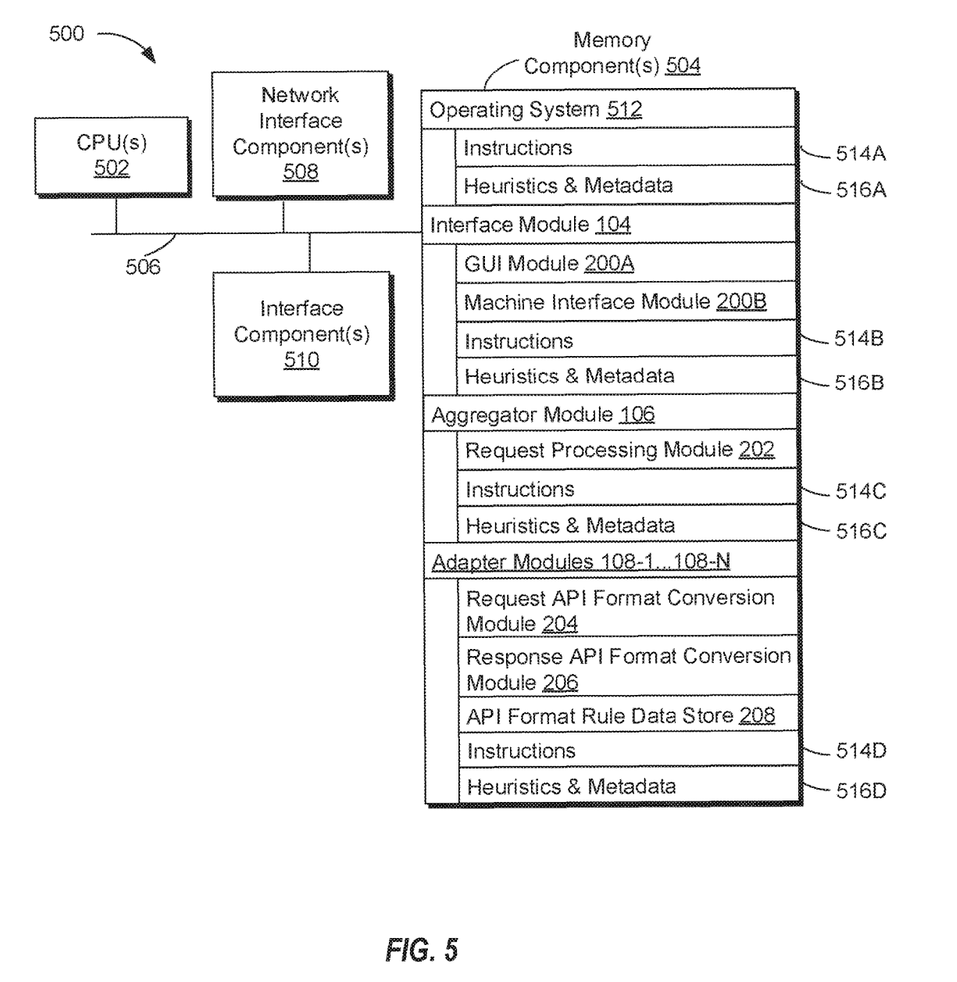
FIG. 5 is a block diagram of a server system enabled with various modules provided to manage mobile devices deployed on multiple different operator networks in accordance with some implementations.

FIG. 5 is a block diagram of a server system 500 enabled with one or more components of the device management system 102 depicted in and described with reference to FIGS. 1 and 2, in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the server system 500 includes one or more CPUs 502, one or more memory components 504, one or more network interface components 508, one or more interface components 510, and one or more communication buses 506 interconnecting these and various other components.

In some implementations, the one or more communication buses 506 include circuitry that interconnects and controls communication between various components of the server system 500. In some implementations, the memory component(s) 504 include high-speed random access memory, such as DRAM, SRAM, DDR RAM, or other random access solid state memory devices. In some implementations, the memory component(s) 504 include non-volatile memory, such as one or more magnetic disk storage devices, optical disk storage devices, flash memory devices, or other non-volatile solid state storage devices. In some implementations, the memory component(s) 504 also optionally include one or more storage devices that are located remotely from the CPU(s) 502. In some implementations, the memory component(s) 504 include non-transitory computer readable storage media.

In some implementations, the memory component(s) 504 store some or all of the following programs, modules, and data structures, including an optional operating system 512, the interface module 104, the aggregator module 106, and the adapter modules 108-1 . . . 108-N. In some implementations, the operating system 512 includes procedures for handling various basic system services and for performing hardware-dependent tasks associated with the server system 500. In some implementations, the interface module 104 further includes one or more of the GUI module 200A and the machine interface module 200B. In some implementations, the aggregator module 106 further includes the request processing module 202. In some implementations, one or more of the adapter modules 108-1 . . . 108-N each further includes the request API format conversion module 204, the response API format conversion module 206, and the API format data store 208.

In some implementations, the interface module 104 receives, such as interprets and/or processes, the request 112-A from the enterprise user 110, as described herein. In some implementations, the interface module 104 receives the request 112-A from a client device associated with the enterprise user 110 or another user. To that end, in some implementations, the interface module 104 includes various instructions and/or logic 514A and heuristics and metadata 516A. In some implementations, the aggregator module 106 selects one of the adapter modules 108-1 . . . 108-N based on the request 112-A, as also described herein. To that end, in some implementations, the aggregator module 106 includes instructions and/or logic 514B and heuristics and metadata 516B. In some implementations, the selected one of the adapter modules 108-1 . . . 108-N bridges communication between the interface module 104 and the one of the operator network(s) 116-1 . . . 116-N associated with the selected adapter module. To that end, in some implementations, each of one or more of the adapter modules 108-1 . . . 108-N includes instructions and/or logic 514C and heuristics and metadata 516C.

While various aspects of implementations within the scope of the appended claims are described above, it should be apparent that the various features of implementations described above may be embodied in a wide variety of forms and that any specific structure and/or function described above is merely illustrative. Based on the present disclosure, one skilled in the art should appreciate that an aspect described herein may be implemented independently of any other aspects and that two or more aspects may be combined in various ways. For example, an apparatus may be implemented and/or a method may be practiced using any number of aspects set forth herein. In addition, such an apparatus may be implemented and/or such a method may be practiced using other structure and/or functionality in addition to, or other than, one or more of the aspects set forth herein.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, without changing the meaning of the description, so long as all occurrences of the "first contact" are renamed consistently and all occurrences of the "second contact" also are renamed consistently. Stated another way, the first contact and the second contact are both contacts, but they are not the same contact.

The terminology used herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or," as used herein, refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at a device management system configured to manage mobile devices associated with different operator networks, wherein the device management system includes a non-transitory memory and one or more processors:
     receiving, at an interface module, a request including an indicator identifying a mobile device and one of a plurality of operator networks associated with the mobile device, wherein the request initiates a change in a configuration state of the mobile device on the one of the plurality of operator networks;

selecting, using an aggregator module, one of a plurality of adapter modules based on the request associated with the mobile device, wherein each of the plurality of adapter modules is configured to communicate with a particular one of the plurality of operator networks; and bridging, using the selected one of the plurality of adapter modules, communication between the interface module and the one of the plurality of operator networks associated with the mobile device.

2. The method of claim 1, wherein the selected one of the plurality of adapter modules is configured to communicate with the one of the plurality of operator networks associated with the mobile device.

3. The method of claim 1, further comprising displaying, using the interface module, a graphical user interface (GUI) to a user, wherein receiving the request comprises receiving the request from the user via the GUI.

4. The method of claim 1, wherein bridging the communication between the interface module and the one of the plurality of operator networks comprises transmitting, using the selected one of the plurality of adapter modules, at least a portion of the request to the one of the plurality of operator networks.

5. The method of claim 4, wherein transmitting at least the portion of the request to the one of the plurality of operator networks comprises transmitting one of the following:
a single query;
first and second queries, wherein the first and second queries are different; and
a pipeline of queries including a plurality of queries, wherein each of the plurality of queries is different.

6. The method of claim 4, wherein bridging the communication between the interface module and the one of the plurality of operator networks further comprises:
receiving, using the selected one of the plurality of adapter modules, a response from the one of the plurality of operator networks in response to transmitting at least the portion of the request; and
transmitting, using the selected one of the plurality of adapter modules, at least a portion of the response to the interface module.

7. The method of claim 6, wherein receiving the response from the one of the plurality of operator networks comprises:
receiving a ticket number;
polling, using the selected one of the plurality of adapter modules, the one of the plurality of operator networks based on the ticket number; and
in response to polling, receiving, using the selected one of the plurality of adapter modules, the response from the one of the plurality of operator networks.

8. The method of claim 6, wherein receiving the response from the one of the plurality of operator networks comprises receiving, using the selected one of the plurality of adapter modules, a push message encapsulating the response from the one of the plurality of operator networks.

9. The method of claim 1, wherein the selected one of the plurality of adapter modules is associated with a first application programming interface (API) configured to receive requests conforming to an adapter API format, and wherein the one of the plurality of operator networks associated with the mobile device is associated with a second API configured to receive requests conforming to a network API format.

10. The method of claim 9, wherein the request conforms to the adapter API format and conforms to the network API format.

11. The method of claim 9, wherein the request conforms to the adapter API format and does not conform to the network API format, and wherein bridging the communication between the interface module and the one of the plurality of operator networks comprises translating, using the selected one of the plurality of adapter modules, at least a portion of the request from the adapter API format to the network API format.

12. The method of claim 9, wherein the second API is further configured to transmit responses conforming to the network API format, wherein the first API is further configured to transmit responses conforming to the adapter API format, and wherein bridging the communication between the interface module and the one of the plurality of operator networks comprises translating, using the selected one of the plurality of adapter modules, from the network API format to the adapter API format at least a portion of a response received from the one of the plurality of operator networks.

13. The method of claim 9, wherein the selected one of the plurality of adapter modules comprises a representational state transfer (REST)-based adapter module, wherein the adapter API format comprises a first REST API format, and wherein the network API format comprises a second REST API format.

14. The method of claim 9, wherein the selected one of the plurality of adapter modules comprises a simple object access protocol (SOAP)-based adapter module, wherein the adapter API format comprises a first SOAP API format, and wherein the network API format comprises a second SOAP API format.

15. The method of claim 9, wherein the selected one of the plurality of adapter modules comprises a file-based adapter module, wherein the adapter API format comprises a file-based API format, and wherein the network API format comprises a format other than the file-based API format.

16. The method of claim 9, wherein the selected one of the plurality of adapter modules comprises one of a representational state transfer (REST)-based adapter module, a simple object access protocol (SOAP)-based adapter module, and a file-based adapter module, wherein one of the adapter API format and the network API format comprises one of a REST API format, a SOAP API format, and a file-based API format, and wherein another one of the adapter API format and the network API format comprises another one of the REST API format, the SOAP API format, and the file-based API format.

17. The method of claim 1, wherein the one of the plurality of operator networks comprises a first one of the plurality of operator networks, wherein the configuration state comprises a first configuration state, wherein the request further includes an indicator identifying a second one of the plurality of operator networks associated with the mobile device, and wherein the request further initiates a change in a second configuration state of the mobile device on the second one of the plurality of operator networks, the method further comprising:
selecting, using the aggregator module, another one of the plurality of adapter modules based on the request associated with the mobile device; and
bridging, using the selected other one of the plurality of adapter modules, communication between the interface module and the second one of the plurality of operator networks associated with the mobile device.

18. The method of claim 17, wherein bridging the communication between the interface module and the first and second ones of the plurality of operator networks comprises one or more of the following:

transmitting, using each of the selected ones of the plurality of adapter modules, at least a portion of the request to the corresponding one of the first and second ones of the plurality of operator networks; and receiving, using each of the selected ones of the plurality of adapter modules, a response from the corresponding one of the first and second ones of the plurality of operator networks in response to transmitting at least the portion of the request, aggregating, using the aggregator module, the received responses, and transmitting, using the aggregator module, at least a portion of the aggregated responses to the interface module.

19. A device management system comprising:

an interface module;

an aggregator module;

a plurality of adapter modules, wherein each of the plurality of adapter modules is configured to communicate with a particular one of a plurality of operator networks;

a processor configured to execute computer readable instructions included in a non-transitory memory; and a non-transitory memory including computer readable instructions, that, when executed by the processor, cause the device management system to:

receive, at the interface module, a request including an indicator identifying a mobile device and one of the plurality of operator networks associated with the mobile device, wherein the request initiates a change in a configuration state of the mobile device on the one of the plurality of operator networks;

select, using the aggregator module, one of the plurality of adapter modules based on the request associated with the mobile device; and bridge, using the selected one of the plurality of adapter modules, communication between the interface module and the one of the plurality of operator networks associated with the mobile device.

20. The device management system of claim 19, wherein the instructions that cause the device management system to bridge the communication between the interface module and the one of the plurality of operator networks cause the device management system to perform one or more of the following:

transmit, using the selected one of the plurality of adapter modules, at least a portion of the request to the one of the plurality of operator networks; and receive, using the selected one of the plurality of adapter modules, a response from the one of the plurality of operator networks in response to transmitting at least the portion of the request, and transmit, using the selected one of the plurality of adapter modules, at least a portion of the response to the interface module.

* * * * *